United States Patent
Shah et al.

(10) Patent No.: US 12,051,025 B2
(45) Date of Patent: Jul. 30, 2024

(54) ARTIFICIAL INTELLIGENCE-ENABLED METADATA OPTIMIZER

(71) Applicant: Accenture Global Solutions Limited, Dublin (IE)

(72) Inventors: Vaibhav Shah, Pune (IN); Hirendra Parihar, Indore (IN); Nikhil Prakash Bhandari, Pune (IN); Ankit Gupta, Phursungi (IN); Anu Saxena, Udam Singh Nagar (IN); Ramesh Peetha, Guntur (IN); Roshan Kumar, Pune (IN); Shraban Nayak, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 122 days.

(21) Appl. No.: 17/161,635

(22) Filed: Jan. 28, 2021

(65) Prior Publication Data
US 2022/0237547 A1  Jul. 28, 2022

(51) Int. Cl.
*G06Q 10/0639* (2023.01)
*G06N 5/04* (2023.01)
(Continued)

(52) U.S. Cl.
CPC ......... *G06Q 10/06395* (2013.01); *G06N 5/04* (2013.01); *G06N 20/00* (2019.01); *G06Q 30/0206* (2013.01)

(58) Field of Classification Search
CPC ......... G06Q 10/06395; G06Q 30/0206; G06N 5/04; G06N 20/00
See application file for complete search history.

(56) References Cited

U.S. PATENT DOCUMENTS

2004/0230572 A1* 11/2004 Omoigui ................ G06F 16/36
2007/0081197 A1*  4/2007 Omoigui ................ G06F 16/36
                                                                    358/1.15
(Continued)

FOREIGN PATENT DOCUMENTS

WO   WO-2014100720 A1   6/2014
WO   WO-2014110167 A2   7/2014

OTHER PUBLICATIONS

Government of India Patent Office, Examination Report issued for Patent Application No. 202244003857, dated Oct. 17, 2022, 7 pages.

*Primary Examiner* — Dylan C White
(74) *Attorney, Agent, or Firm* — Norton Rose Fulbright US LLP

(57) ABSTRACT

Aspects of the present disclosure provide systems, methods, and computer-readable storage media that support automated optimization of product management systems. In embodiments, automated optimization of component tools of the product management system is provided by automated evaluation and optimization of associated rules and metadata. In embodiments, metadata and rules may be associated to each other by an assessment engine. A recommendation engine may then identify non-compliant metadata, may determine a condition of the rule, and/or may generate recommendations for the rules based on the non-compliant metadata. Automated optimization of the product management system may include automated creation and mapping of decomposition relationships between commercial products and technical products. In embodiments, input data may be parsed into a set of object with unique attribute fields, which may then be validated. Validated data objects are then (Continued)

processed by an optimization engine that automatically creates and maps decomposition relationships from the validated data.

14 Claims, 4 Drawing Sheets

(51) Int. Cl.
  *G06N 20/00* (2019.01)
  *G06Q 30/0201* (2023.01)

(56) References Cited

U.S. PATENT DOCUMENTS

| | | | |
|---|---|---|---|
| 2017/0178002 A1* | 6/2017 | Moriarty | G06N 7/01 |
| 2019/0096526 A1* | 3/2019 | Hirsch | G16H 20/70 |
| 2020/0219013 A1 | 7/2020 | Wellman et al. | |
| 2022/0237547 A1* | 7/2022 | Shah | G06Q 10/06395 |
| 2022/0253497 A1* | 8/2022 | Bellare | G06Q 30/0631 |
| 2022/0342774 A1* | 10/2022 | Butucea Panait | G06F 11/1461 |

* cited by examiner

ARTIFICIAL INTELLIGENCE-ENABLED METADATA OPTIMIZER

TECHNICAL FIELD

The present disclosure relates generally to an edge architecture, and more particularly to a system for assessing and optimizing data evaluation rules based on artificial intelligence algorithms.

BACKGROUND

Customer relationship management (CRM) systems allow organizations to manage various aspects of a product and customer life cycles. For example, CRM systems allow organizations to track the entire sale cycle of a product, provide and track service management, etc. As part of those capabilities, some current systems provide a configure-price-quote (CPQ) platform for product management, product pricing, price-book, quotation, documentation, and other aspects of a product and/or service sale cycle. CPQs provide this functionality by providing a platform with various components or tools, in which a vast amount of technical data may be generated, stored, and/or used to assess different aspects of products and services. For example, the data in the CPQ may be used to properly price a product or service based on different factors, such as geographic location, date/time, market, etc. In some cases, a user may specify rules regarding various aspects of the CPQ functionality. Those rules may specify, for example, how to manage a particular product (e.g., offer for sale as part of another product offering, deactivate product if the product is not purchased after a certain period of time, activate the product as part of a campaign, etc.), technical data related to different components (e.g., a particular structure or limits on data structures used and/or generated by the various components), etc.

However, the technical data used in the CPQ is so vast that in current systems, such data often becomes stale. The various rules may become outdated, products in the system may become inactive, rules may become stale and/or reflect bad practices from the perspective of the CPQ component. Currently, there is no automated mechanism for assessing CPQ systems, let alone one in which CPQ components may be assessed individually, improved dynamically, and with recommendations provided in real-time.

SUMMARY

Aspects of the present disclosure provide systems, methods, and computer-readable storage media that support automated optimization and assessment of product management systems. In particular, aspects of the present disclosure provide for automated assessment of component tools of the product management system by automated evaluation and optimization of associated rules and metadata using machine learning (ML) algorithms and/or artificial intelligence (AI) engines. In some aspects, metadata associated with a component tool may be received, along with associated rules, by an assessment engine, which may process the metadata and the rules to provide an association between the metadata and the rules (e.g., generate a matrix associating different categories of metadata to corresponding rules, and may provide an indication of the acceptance level (e.g., a priority level) of the rule with respect to the component tool). In aspects, the processed metadata and rules may then be provided to an AI recommendation engine that may identify non-compliant metadata (e.g., metadata that indicates a violation or degradation of the associated rule), and determine a condition of the rule (e.g., good rule, outdated rule, underused rule, etc.). In aspects, the AI recommendation engine may also generate recommendations for each of the rules based on the non-compliant metadata. In some aspects, the recommendations may include an action that may be taken by a user, such as updating the rule, deactivating the rule, creating a new rule, etc. The recommendations may be presented to the user, and may prompt the user to select or take some action. In some aspects, an indication of the action selected or taken by the user may be fed back to the ML algorithms and AI engines, and the ML algorithms and AI engines may learn and improve the detection of the non-compliant metadata and the recommendations provided to the user. In some aspects, the feedback of the indication of the action selected by the user with respect to a rule may be used to update the acceptance level of the rule.

In aspects of the present disclosure, automated assessment and optimization of the product management system may include intelligent and automated assessment and creation of decomposition relationships. In some aspects, an optimization engine may be used to analyze input product data that may include commercial product data and technical product data. The input data may be first validated by a validation process that may include determining whether the input data is good data, and determining existing decomposition relationships between the commercial products and the technical products, and whether those existing decomposition relationships are valid. In aspects, valid existing decomposition relationships may be used, and/or new decomposition relationships may be created. In aspects, new decomposition relationships may then be validated to ensure these decomposition relationships are correct and valid, and have a valid format. The results, including the validated data, the identified invalid data, the invalid decomposition relationships, and/or the new decomposition relationships may be presented to a user who may select some action (e.g., delete bad data, update the data, correct an invalid decomposition relationship, accept new decomposition relationships, etc.).

In one particular implementation, a method for optimizing component tools of a product management system includes receiving at least one metadata including data associated with at least one characteristic of the at least one metadata, and obtaining at least one rule configured to evaluate the at least one characteristic of the at least one metadata against a predefined criteria. The method also includes inputting the at least one rule and the at least one metadata into an assessment engine. In embodiments, the assessment engine is configured to associate the at least one rule with the at least one metadata. The method further includes inputting the associated at least one metadata and at least one rule into a recommendation engine. In embodiments, the recommendation engine is configured to identify non-compliant metadata from the at least one metadata based on the associated at least one rule, and to generate at least one optimization recommendation for the at least one rule associated with the non-compliant metadata. The method also includes displaying the at least one optimization recommendation to a user.

In additional aspects, a system for optimizing metadata evaluation rules includes a rules assessment manager configured to receive at least one metadata including data associated with at least one characteristic of the at least one metadata, to obtain at least one rule configured to evaluate at least one characteristic of metadata against a predefined criteria, and to associate the at least one rule with the at least one metadata. The system also includes a recommendation engine configured to receive the associated at least one metadata and at least one rule, to identify non-compliant metadata from the at least one metadata based on the associated at least one rule, and to generate at least one optimization recommendation for the at least one rule associated with the non-compliant metadata. The system further includes a user interface configured to display the at least one optimization recommendation to a user.

In additional aspects, a method for building decomposition relationships in a product management system includes receiving a first input including product data defining at least one characteristic of a first type of product, receiving a second input including product data defining at least one characteristic of a second type of product, determining whether a mapping between the at least one characteristic of the first type of product and the at least one characteristic of the second type of product exists in a database of the product management system, and validating the mapping in response to a determination that a mapping between the at least one characteristic of the first type of product and the at least one characteristic of the second type of product exists in the database of the product management system. The method also includes generating a decomposition relationship between the first type of product and the second type of product based on the mapping when the mapping is determined to be valid. The method also includes, when the mapping is determined to be invalid, generating a new mapping between the at least one characteristic of the first type of product and the at least one characteristic of the second type of product, validating the new mapping to determine whether the new mapping is correct, and generating the decomposition relationship between the first type of product and the second type of product based on the new mapping when the new mapping is determined to be valid. The method also includes displaying the decomposition relationship between the first type of product and the second type of product to a user.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

Figure 1:
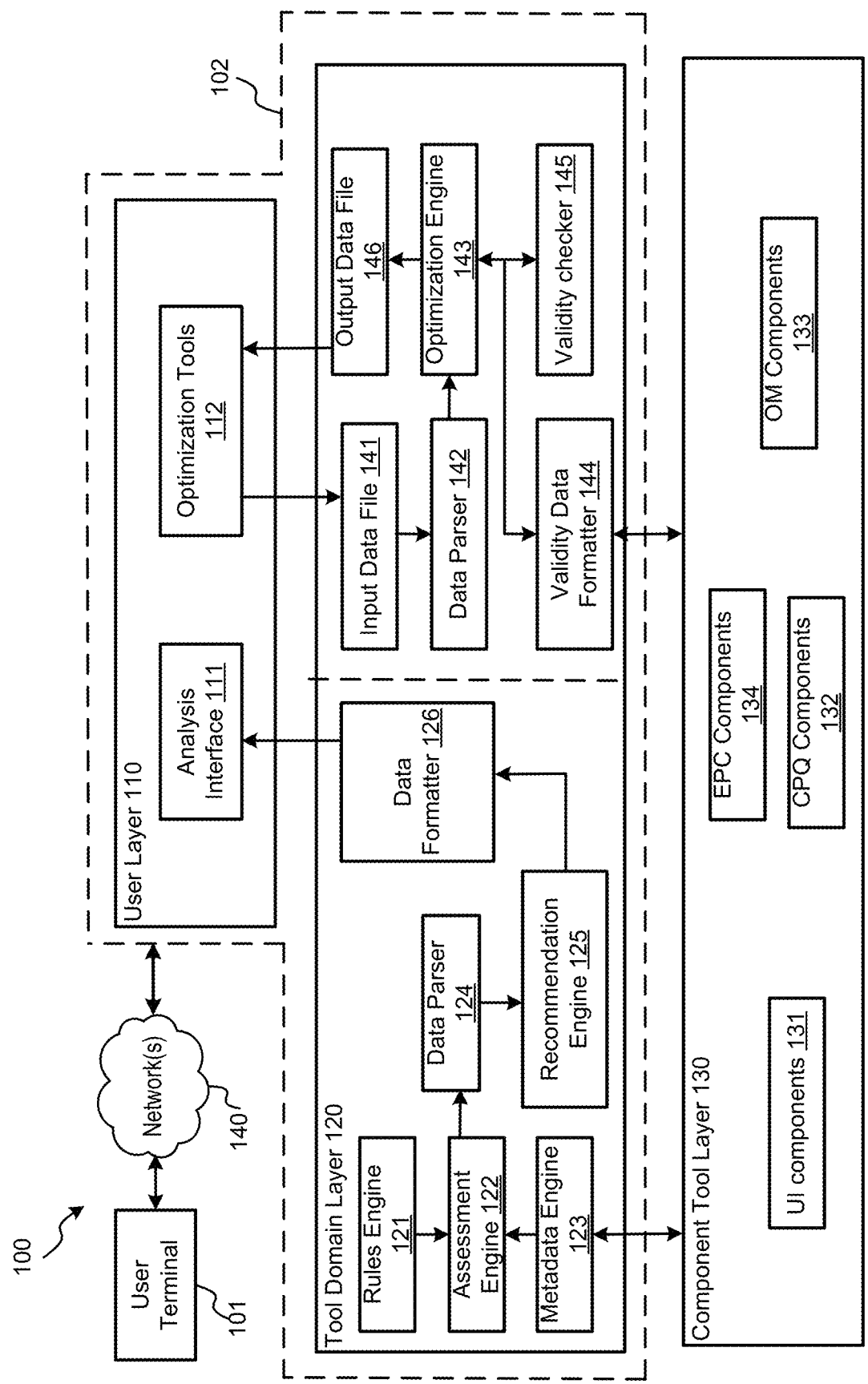
FIG. 1 a block diagram of a system providing automated assessment and optimization of product management systems in accordance with aspects of the present disclosure.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

The systems and methods disclosed herein provide automated assessment and optimization of product management systems. In particular, the disclosed systems and methods may provide for automated assessment of component tools of the product management system by automated evaluation and optimization of associated rules and metadata. In aspects, metadata and rules associated with a component tool may be received by an assessment engine, and the assessment engine may process the metadata and the rules to provide an association between the categories of metadata and corresponding rules, including a current acceptance level of the rule with respect to the component tool. In aspects, the processed metadata and rules may then be processed by an AI recommendation engine that may identify non-compliant metadata, may determine a condition of the rule, and/or may generate recommendations for each of the rules based on the non-compliant metadata. In some aspects, the recommendations (e.g., recommended actions) may be presented to a user, and the selected action, which may include the user ignoring the recommendation, may be fed back to the assessment engine and the recommendation engine. The assessment engine and the recommendation engine may learn from the user selected action and may improve or refine the detection of the non-compliant metadata and the recommendations provided to the user based on the selected action.

The disclosed system and methods may also provide for automated assessment and creation of decomposition relations. In some aspects, an optimization engine may be used to analyze input product data that may include commercial product data and technical product data. The input data may be first validated by a validation process that may include determining whether the input data is good data, and determining existing decomposition relationships between the commercial products and the technical products, and whether those existing decomposition relationships are valid. In aspects, valid existing decomposition relationships may be used, and/or new decomposition relationships may be created. In aspects, new decomposition relationships may then be validated to ensure these decomposition relationships are correct and valid, and have a valid format. The results, including the validated data, the identified invalid data, the invalid decomposition relationships, and/or the new decomposition relationships may be presented to a user for action.

Referring to FIG. 1, a block diagram of a system providing automated assessment and optimization of product management systems in accordance with embodiments of the present disclosure is shown as system 100. As shown in FIG. 1, system 100 may include user terminal 101, server 102, component tool layer 130, and network 140. These components, and their individual components, may cooperatively operate to provide functionality in accordance with the disclosure herein. For example, in operation according to embodiments, a user may request an assessment of a product management system implementation. The request may be provided by the user using user terminal 101, and may be transmitted, via network 140, to server 102 and/or component tool layer 130.

In aspects, metadata and/or rules associated with component tools (also referred to herein as simply "components") may be received by components of server 102 from component tool layer 130. The metadata and/or rules received from component tool layer 130 may be associated with various individual component tools of a product management system. The various components of server 102 may cooperatively operate to analyze and process the metadata and/or users and may apply rules, algorithms, machine learning algorithms, artificial intelligence algorithms, and/or other analytical processes, as described below, to associate the rules to metadata, to determine a condition of the rules, to generate recommendations of actions a user may select with respect to the rules, to present those recommendations to the user, and to refine the recommendations based on a user-selected action. In some embodiments, the process performed by server 102 may be triggered automatically, based on some condition, with a use initiating a request.

In some aspects, product data may be received by components of server 102 via user layer 110. For example, a user may provide an input, via user terminal 101 that includes commercial product data and technical product data. The various components of server 102 may cooperatively operate to analyze and process the metadata and/or users and may apply rules, algorithms, machine learning algorithms, artificial intelligence algorithms, and/or other analytical processes, as described below, to validate the input data, to validate existing decomposition relationships, to create and validate new decomposition relationships, and to present the results to the user.

What follows is a more detailed discussion of the functional blocks of system 100 shown in FIG. 1. However, it is noted that the functional blocks, and components thereof, of system 100 of embodiments of the present invention may be implemented using processors, electronic devices, hardware devices, electronic components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally or alternatively, when implemented in software, one or more of the functional blocks, or some portion thereof, may comprise code segments operable upon a processor to provide logic for performing the functions described herein.

It is also noted that various components of system 100 are illustrated as single and separate components. However, it will be appreciated that each of the various illustrated components may be implemented as a single component (e.g., a single application, server module, etc.), may be functional components of a single component, or the functionality of these various components may be distributed over multiple devices/components. In such aspects, the functionality of each respective component may be aggregated from the functionality of multiple modules residing in a single, or in multiple devices.

It is further noted that functionalities described with reference to each of the different functional blocks of system 100 described herein is provided for purposes of illustration, rather than by way of limitation and that functionalities described as being provided by different functional blocks may be combined into a single component or may be provided via computing resources disposed in a cloud-based environment accessible over a network, such as one of network 140.

User terminal 101 may be implemented as a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. User terminal 101 may be configured to provide a Graphical User Interface (GUI) structured to facilitate input and output operations in accordance with aspects of the present disclosure. Input and output operations may include operations for requesting an assessment of component tools (e.g., all the component tools or specific component tools) of a product management system, displaying the results of the assessment (e.g., non-compliant metadata, rules recommendations, selectable options for action associated with the rules recommendations, etc.). In some aspect, input and output operations may also include the user requesting automated validation and/or generation of decomposition relationship, providing input data, and displaying the results (e.g., displaying of invalid data, invalid decomposition relationships, newly created and/or recommended decomposition relationships, etc.).

In some aspects, server 102 and user terminal 101 may be communicatively coupled via network 140. Network 140 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc.

It is noted that although server 102 and component tool layer 130 are illustrated as being in direct communication, server 102 and component tool layer 130 may be communicatively coupled via network 140. It is also noted that although component tool layer 130 and user terminal 101 are not illustrated as communicatively coupled, in some embodiments, component tool layer 130 and user terminal 101 may be communicatively coupled via network 140. For example, in some embodiments, the user request for an assessment of the product management system implementation may be transmitted to component tool layer 130, in addition or in the alternative to server 102.

Component tool layer 130 may include the component tools that are associated or part of the product management system to be assessed and optimized in accordance with aspects of the present disclosure. In aspects, the component layer 130 may include various component tools, which may include modules, components, tools, and/or engines of the product management system configured to provide specific functionality of the product management system. For example, the product management system may include user interface (UI) component 131, which may include tools that provide UI functionality for the product management system. In aspects, UI component 131 may include metadata related to various structures and UI elements of UI component 131. In aspects, custom metadata may define and/or specify rules associated with the various metadata of UI component 131. In some aspects, the product management system may include enterprise product catalog (EPC) component 134, which may include tools that provide EPC functionality for the product management system. For example, in some aspects, EPC component 134 may include data specifying a current catalog of products (e.g., commercial products, technical products, etc.). In aspects, EPC component 134 may include metadata related to various structures and elements of EPC component 134. In embodiments, EPC component 134 may provide metadata related to specific products and/or services. In aspects, custom metadata may define and/or specify rules associated with the various metadata of EPC component 134.

In some aspects, the product management system may include order management (OM) component 133, which may include tools that provide OM functionality for the product management system. For example, in some aspects, OM component 133 may include data defining functions for handling and processing orders of products and/or services. In aspects, OM component 133 may include metadata related to various structures and elements of OM component 133. In embodiments, OM component 133 may provide metadata related to specific orders of particular products and/or services. In aspects, custom metadata may define and/or specify rules associated with the various metadata of OM component 133.

In some aspects, the product management system may include CPQ component 132, which may include tools that provide pricing management functionality for the product management system. For example, in some aspects, CPQ component 132 may include data defining functions for determining an appropriate price for products and/or services. In aspects, CPQ component 132 may include metadata related to various structures and elements of CPQ component 132. In embodiments, CPQ component 132 may provide metadata related to pricing of specific products and/or services. In aspects, custom metadata may define and/or specify rules associated with the various metadata of CPQ component 132.

Although shown separate from server 102, component tool layer 130, and the individual components thereof, may be integrated and/or part of server 102, or may include components (e.g., software or hardware components) that are deployed within the product management system and may provide functionality to interface with the various component tools of the product management system to obtain data (e.g., metadata) to enable the functionality herein described. In these cases, the component tools described above may not be the actual components of the product management system, but may interface with the respective components.

As noted above, server 102 may be configured to obtain data (e.g., metadata and rules, and/or product data input) and to optimize the product management system by automatically assessing the rules and providing recommendations for improving associated component tools, and/or by validating product data and creating and/or validating decomposition relationships in accordance with embodiments of the present disclosure. The functionality of server 102 may be provided by the cooperative operation of various components of server 102, as will be described in more detail below. Although FIG. 1 shows a single server 102, it will be appreciated that server 102 and its individual functional blocks may be implemented as a single device or may be distributed over multiple devices having their own processing resources, whose aggregate functionality may be configured to perform operations in accordance with the present disclosure. In some embodiments, server 102 may be implemented, wholly or in part, on an on-site system, or on a cloud-based system.

As shown in FIG. 1, server 102 includes user layer 110 and tool domain layer 120. It is noted that the description and conceptualization of server 102's functionality with respect to user layer 110 and tool domain layer 120 are for illustrative and ease of explanation purpose, and not by way of limitation. Indeed, in aspects, the functionality described herein may be implemented in different structural variations. For example, different layers may be implemented with different components. Again, this discussion with respect to "layers" is for illustrative purposes and should not be construed as limiting in any way.

It is noted that the various components of server 102 are illustrated as single and separate components in FIG. 1. However, it will be appreciated that each of the various components of server 102 may be a single component (e.g., a single application, server module, etc.), may be functional components of a same component, or the functionality may be distributed over multiple devices/components. In such aspects, the functionality of each respective component may be aggregated from the functionality of multiple modules residing in a single, or in multiple devices.

In some aspects, server 102 may include a processor (not shown) and memory (not shown). The processor may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some aspects, implementations of the processor may comprise code segments (e.g., software, firmware, and/or hardware logic) executable in hardware, such as a processor, to perform the tasks and functions described herein. In yet other aspects, the processor may be implemented as a combination of hardware and software. The processor may be communicatively coupled to the memory.

In aspects, the memory (not shown) may comprise read only memory (ROM) devices, random access memory (RAM) devices, one or more hard disk drives (HDDs), flash memory devices, solid state drives (SSDs), other devices configured to store data in a persistent or non-persistent state, network memory, cloud memory, local memory, or a combination of different memory devices. The memory may store instructions that, when executed by the processor, cause the processor to perform operations in accordance with the present disclosure. In aspects, the memory may also be configured to facilitate storage operations. For example, in some embodiments, the memory may comprise a database configured to store metadata, rules, product data, user information, configuration information, etc., for operations of system 100 in accordance with the present disclosure.

As shown, user layer 110 may include analysis interface 111 and optimization tools 112. In aspects, analysis interface 111 may be configured to provide functionality for structuring interfaces to enable a user to leverage the functionality of server 102 to assess rules and metadata and to provide recommendations. In aspects, analysis interface 111 may be configured to provide a graphical user interface (GUI) that may be presented to a user (e.g., via user terminal 101) and allows the user to initiate and/or to request an assessment of the product management system and/or of the component tools of the component tool layer 130. In aspects, analysis interface 111 may be configured to present the results of the assessment to the user, including identified non-compliant metadata, and rules recommendations. In aspects, presenting the rules recommendations to the user may include displaying recommended actions as selectable graphical elements, and may include recommending that the user update the rule, deactivate the rule, create a new rule, ignore the recommended actions, etc., and/or that the user take action upon the non-compliant metadata to correct the violation of the rule. It will be appreciated that many variations for disposing, modifying, validating, ignoring, or otherwise acting (and/or not-acting) upon a rule may be recommended. In aspects, the recommended actions may apply to a set of rules (e.g., a category of rules) or may be applicable to a single use. In the latter case, the user may be informed (e.g., by an indication, or by associating the recommendation to a particular rule) to which rule the recommendation or recommendations apply. The user may select one of the recommended options (e.g., actions) or may simply ignore the recommendation and not select any action.

Optimization tools 112 may be configured to provide functionality for structuring interfaces to enable a user to leverage the functionality of server 102 for automated assessment and creation of decomposition relationships. In aspects, optimization tools 112 may provide an interface (e.g., via user terminal 101) that may allow a user to initiate and/or to request automatic validation and/or creation of decomposition relationships. In some aspects, optimization tools 112 may be configured to allow the user to provide input data file 141, which may include input commercial product data and input technical product data that is fed into optimization engine 143, validated, and used to create and map decomposition relationships for the input data. Further details on the functionality of server 102 for automated assessment and creation of decomposition relationships will be described below.

As shown in FIG. 1, tool domain layer 120 may include rules engine 121, assessment engine 122, metadata engine 123, data parser 124, recommendation engine 125 and data formatter 126. In aspects, these components may cooperatively operate to provide functionality for automated assessment of component tools of the product management system by automated evaluation and optimization of associated rules and metadata in accordance with aspects of the present disclosure. In particular, these components cooperatively operate to identify non-compliant metadata and associated rules, and to provide recommendations for improving the component tools of the product management system associated with the metadata and rules.

Metadata engine 123 may be configured to obtain or receive a set of metadata from component tool layer 130. In aspects, the set of metadata may include data associated with the various component tools of the product management system. The metadata may include structure metadata, product metadata, etc., and may include different categories of metadata. In aspects, the set of metadata may be associated with one or more component tools of the product management system.

Rules engine 121 may be configured to store, obtain, and/or receive rules (e.g., predetermined or pre-established rules) that define specific constraints, restrictions, controls, allowances, configuration, patterns, etc., for data associated with the structures defined by the set of metadata. In aspects, rules engine 121 may be configured to obtain the set of rules from custom metadata, from configuration, and/or from a user. In aspects, the custom metadata may be received from the product management system, and may be structured in a particular format (e.g., a salesforce object format), and/or may be provided to rules engine 121 during run time, and/or after the user has logged into the system. In some embodiments, the custom metadata may be user-specific, and a rule, or a set of rules, for one user may not be defined for another user. In some aspects, the set of rules may apply to an individual category of the set of metadata or may apply to multiple categories of metadata. In aspects, the set of rules may be associated with a specific component tool of the product management system, or may apply to more than one component tool. In aspects, more than one rule may apply to a single metadata type, and a single rule may apply to multiple metadata types. Table 1 below shows an example of several rules implemented in accordance with aspects of the present disclosure.

TABLE 1

Example rules

| Metadata Type | Rules |
| --- | --- |
| UI Template | Number of HTML Lines in the template should be restricted to 200 Lines |
| Omniscript | Number of elements used in building Omniscripts should not be greater than 200 |
| DataRapator | 1. For DataRapator of action type Load, number domain objects cannot be more than 3. |
| | 2. For DataRapator of action type Extract, number domain objects cannot be more than 3 or fields retrieved cannot be more than 30. |
| | 3. For DataRapator of action type Transform, number of fields cannot be more than 200. |

As can be seen in Table 1, for a particular metadata type, a rules may be specified. In aspects, the rule specified for the type of metadata may specify the structure that data associated with the metadata type should follow. In another example, not shown, a rule for a product metadata type may specify that when a first product is added to a shopping cart by a user, a second product be recommended for purchase. This type of rule may be used manage the sale cycle of products. Metadata associated with this rule may include metadata associated with the type of the first product, and may include sales information indicating purchase information about the first product and the second product. As will be described below, the functionality of aspects of the present disclosure may be applied to the information to assess the effectiveness of the rule.

Assessment engine 122 may be configured to process the metadata and the rules to provide an association between the metadata and the rules. In some aspects, the association may also represent an acceptance level of the rule with respect to the component tool associated with the rule and metadata. In aspects, as noted above, assessment engine 122 may receive at least two inputs. One input may include a set of metadata received from component layer 130, and the other input may include the set of rules described above with respect to rules engine 121. In aspects, the output of assessment engine 122 may be a set of data representing statistics containing aggregate and individual results for rules associated with each metadata category.

In aspects, assessment engine 122 may include software, hardware, and/or any combination thereof, and may be configured to execute instructions to implement functions, algorithms, and/or processes for providing the functionality of assessment engine 122. In mathematical terms, the algorithm implemented by assessment engine 122 may generate a many-to-many relationships matrix defining relationships between the set of metadata and the set of rules.

In aspects, defining the set of metadata as $M=\{m_1, m_2, m_3, \ldots, m_m\}$, and the set of rules as $R=\{r_1, r_2, r_3, \ldots, r_n\}$, where m is the number of metadata in the set of metadata, and n is the number of rules in the set of rules, the many-to-many relationships matrix defining relationships between the set of metadata and the set of rules may be given by M×R and defined by equation 1 as follows:

$$M \times R = \begin{bmatrix} m_1 r_1 & \cdots & m_1 r_n \\ \vdots & \ddots & \vdots \\ m_m r_1 & \cdots & m_m r_n \end{bmatrix} \quad (1)$$

In aspects, the value of $m_x r_y$ may represent the association between metadata x and rule y, but may also be used to determine the acceptance value of the rule based on a user action, as will be described below. In aspects, the processed metadata and rules (e.g., matrix M×R) may be provided to recommendation engine 125. However, in some embodiments, the processed metadata and rules (e.g., matrix M×R) may be provided to a data parser (e.g., data parser 124) for processing before the data is provided to recommendation engine 125.

Data parser 124 may be configured to convert raw data into a data set that may be understood by the recommendation engine. For example, in some aspects, data parser 124 may receive as input, from assessment engine 122, raw data representing e.g., matrix M×R. Data parser 124 may include logic that when executed by a processor may iterate over the raw data and may convert the raw data into plain objects using object wrappers (e.g., using apex wrapper class techniques). In some assessment, the input from assessment engine 122 may be parsed by data parser 124 to remove excess data and to format the raw data into a structure that is understandable by an artificial intelligence engine (e.g., recommendation engine 125). In aspects, the format into which the raw data is converted may be predefined and preconfigured. In this case, data parser 124 may retrieve a predefined format template and convert the raw data received from assessment engine 122 and apply the predefined format template to convert the raw data into understandable data.

In aspects, the formatted processed metadata and rules (e.g., processed and parsed matrix M×R) may be provided to recommendation engine 125. Recommendation engine 125 may be configured to identify non-compliant metadata based on the set of metadata and the associated set of rules. In aspects, as noted above, the non-compliant metadata identified by recommendation engine 125 may be metadata that does not comply with the associated rule, or rules, or may be metadata that degrades the rule. Recommendation engine 125 may also be configured to provide recommendations with respect to the rules associated with the non-compliant metadata. The recommendations may include recommended actions that a user may take or follow. In aspects, the recommendations may be made based on the non-compliant metadata (e.g., may be made to accommodate the non-compliant metadata), or may be based on default recommendations (e.g., may be made without consideration as to whether the non-compliant metadata is accommodated). For example, a rule may specify that when a first product is added to a shopping cart by a user, a second product be recommended for purchase. Recommendation engine 125 may determine that product metadata related to the first and second product indicates that the second product has not been added to a shopping cart in the last year when the first product is added to the shopping cart. In this case, recommendation engine 125 may determine that the metadata degrades the rule, as recommending the second product has not been effective in the last year, and may determine that the metadata is non-compliant. Recommendation engine 125 may also determine that the rule is not in a good condition, as it is not having a potentially desired effect. In this case, recommendation engine 125 may generate at least one recommendation associated with the rule.

In aspects, the recommendations generated by recommendation engine 125 may include at least one action that may be taken with respect to the rule. In some aspects, an action may be selected and taken automatically, and in other aspects the recommended actions may be presented to a user for selection. In embodiments, the recommended actions may identify the non-compliant metadata, and may provide a recommendation to correct or address the non-compliance. In some embodiments, recommended actions may include deprecating, deleting, deactivating, updating, deprioritizing, modifying, etc., the rule, creating a new rule, etc. In aspects, the recommended actions may include ignoring the recommendation. This may be useful when the user may decide to keep the rule as it is based on other considerations, such as expectation that the market may change, that the second product may become popular, etc. In aspects, the recommendations may include a single recommended action associated with the rule, or may include multiple recommended actions. Table 2 shows examples of recommended actions that recommendation engine 125 may generate.

TABLE 2

Example recommendations

| Metadata Type | Rules | Recommendation |
| --- | --- | --- |
| UI Template | Number of HTML Lines in the template should be restricted to 200 Lines | Divide the code into separate re-usable template, which could increase readability and easy to debug. |

TABLE 2-continued

Example recommendations

| Metadata Type | Rules | Recommendation |
| --- | --- | --- |
| Omniscript | Number of elements used in building Omniscripts should not be greater than 200 | Separate the independent element in a different reusable Omniscript, it would reduce the initial load time of the application. |
| DataRapator | 1. For DataRapator of action type Load, number domain objects cannot be more than 3. | Rule 1 - increase the number of allowed domains to 5. |
| | 2. For DataRapator of action type Extract, number domain objects cannot be more than 3 or fields retrieved cannot be more than 30. | Rule 2 - deprecate rule, because rule has been ignored for the last 5 iteration.. |
| | 3. For DataRapator of action type Transform, number of fields cannot be more than 200. | Rule 3 - increase the number of fields to 300. |

It will be appreciated that the recommended actions illustrated in Table 2 are merely for illustrative purposes and should not be construed as limiting in any way. In some embodiments, other recommendations may be generated. As shown in the example illustrated in Table 2, recommendation engine 125 may identify non-compliant metadata associated with a UI template rule that specifies that the number of hypertext markup language (HTML) lines in a UI template should be restricted to 200 lines. In this case, recommendation engine 125 may find in the UI type metadata associated with this UI rule that the rule has not been followed. For example, the recommendation engine 125 may find that code associated with UI Template objects indicate that HTML templates are larger than 200 lines. In this case, recommendation engine 125 may recommend that the code be divided into separate re-usable templates, which would help to meet the 200 line limit of the UI rule.

In another example illustrated in Table 2, recommendation engine 125 may find that metadata associated with a DataRapator type object indicates that one of the rules associated with the metadata has not been followed consistently. For example, recommendation engine 125 may find that a threshold number of metadata associated with the rule indicates that the DataRapator rule is not being followed. In some aspects, the threshold may be any predefined number, or may be defined dynamically by recommendation engine 125 based on previous and subsequent analysis (e.g., based on whether a user accepts the recommended action or not). In this example, recommendation engine 125 may recommend that to the user that the rule be modified or deprecated, rather than making recommendations with respect to the data itself. For example, rather than recommending that the number of domains for a Load type action object be decreased, recommendation engine 125 may recommend that the rule be modified to increase the number of domains allowed for a Load type action. In this manner, recommendation engine 125 is flexible, robust, and intelligent enough to provide recommendations regarding the rules, and recommendations regarding data objects associated with the metadata.

Conceptually, recommendation engine 125 identifies bad practices and makes recommendations based on those bad practices. The bad practices may be defined by the rules and the associated non-compliant metadata. Recommendation engine 125 provides functionality to correct those bad practices, or to update the definition of the bad practices to accommodate changes and evolution of the product management system. In addition, recommendation engine 125 may be self-learning, and may be configured to receive an indication of an action selected by the user (and or whether any action was selected or not). This information is fed back into the process executed by recommendation engine 125 in order to learn from the user-selected action. For example, where a recommendation is made with respect to a rule and non-compliant metadata, and the user ignores a recommendation, recommendation engine 125 may learn from the user's action that the acceptance value of the rule may be less than the current acceptance value, and may downgrade the priority of the rule such that any recommendation may take into account the decreased acceptance value. In some aspects, after a threshold number of iterations in which the recommendation is ignored, recommendation engine 125 may recommend that the rule be deprecated or deactivated, or may provide a different recommendation based on the user ignoring the recommendation.

In aspects, recommendation engine 125 may include software, hardware, and/or any combination thereof, and may be configured to execute instructions to implement functions, algorithms, and/or processes for providing the functionality of recommendation engine 125. In mathematical terms, the algorithm implemented by recommendation engine 125 may generate a set of data that includes recommendations for corresponding metadata and associated rules.

The relationship matrix M×R generated by assessment engine 122 may be received by recommendation engine 125. Recommendation engine 125 may process the relationship matrix M×R and may generate a set of non-compliant metadata defined by:

$$M'=\{m'_1, m'^2, m'_3, \ldots, m'_l\} \quad (2)$$

where $l \in \mathbb{N}$, and $l=|M'|$.

In aspects, each m' may represent a non-compliant metadata based on a rule and the associated metadata.

Recommendation engine 125 may also generate a set of recommendations defined by:

$$I=\{i_1, i_2, i_3, \ldots, i_k\} \quad (3)$$

where $k \in \mathbb{N}$, and $k=|I|$.

In aspects, each i may represent a recommendation. In aspects, a relationship matrix may be obtained from M' and I. The relationship matrix M'×I may denote a number of non-compliant metadata having a respective recommendations and may be denoted by:

$$M' \times I = \begin{bmatrix} m'_1 i_1 & \cdots & m'_1 i_k \\ \vdots & \ddots & \vdots \\ m'_l i_1 & \cdots & m'_l i_k \end{bmatrix} \quad (4)$$

where m'x may have $I'=\Sigma^{k'}_{i=0}$, $k' \in \mathbb{N}$, and $k' \leq k$, and may be designated as $\{m',i'\}$.

In aspects, the relationship matrix M'×I may be provided to data formatter 126. Data formatter 126 may be configured to transform and format the data from the relationship matrix M'×I provided by recommendation engine 125 into a particular format (e.g., a representational state transfer (REST) advance programming interface (API) acceptance format, which may include a JavaScript object notation (JSON), extensible markup language (XML), and/or plain text format) that may be displayed for presentation to the user by analysis interface 111. In aspects, the formatted output from data formatter 126 may represent a set of data that may include non-compliant metadata, rules associated with the non-compliant metadata, and respective recommendations. The set of data may be defined as in equation 5:

$$J = \Sigma_{v=0}^{k} \{m'_v, \Sigma r_n, \Sigma i_{k'}\} \quad (5)$$

where n' represents the rules defined for non-compliant metadata $m'_v$, such that $1 \leq n' \leq n$.

In aspects, the recommendations, and in some aspects the rules and associated non-compliant metadata, may be presented (e.g., displayed) to the user. The user may select or take an action A with respect to the recommendation. In aspects, user-selected action A may be defined as $m'_z i_z$, where z is the index of the element from M'×I such that $1 \leq z \leq k$. In aspects, user-selected action A may be fed back to M×R, which represents the metadata-rule relationship, as described above, and the acceptance-value of the rule may be updated by the user-selected action A.

With reference back to FIG. 1, tool domain layer 120 of server 102 may also include input data file 141, data parser 142, optimization engine 143, validity data formatter 144, validity checker 145, and output data file 146. In aspects, these components may cooperatively operate to provide functionality for intelligent and automated assessment and creation of decomposition relationships in accordance with aspects of the present disclosure. In particular, these components cooperatively operate to analyze input product data that may include commercial product data and technical product data, and to validate, create, and map decomposition relationships for the product data.

A decomposition of a commercial product may represent a structure of intermediate products that are assembled into the commercial product. In aspects of the present disclosure, a commercial product may be decomposed into technical products. In that sense, technical products may be thought of as the components, tasks, and services that make up a commercial product. Building decomposition relationships between the technical products and the commercial product is essential to develop, manufacture, or otherwise make the commercial product. In some aspects, the relationship between the commercial product and the technical products may be based on a decomposition of the commercial product into the technical products. In aspects, a decomposition relationship between a technical product and the commercial product may include a decomposition relationship between a characteristic of the commercial product and a characteristic of the technical product. One particular and illustrative example of a commercial product decomposition may include a decomposition of a computer. A computer may be decomposed into component products (e.g., monitor, mouse, keyboard, memory, storage, motherboard, processor, etc.). In accordance with aspects of the present disclosure, decomposition relationships between the commercial product and technical products may be automatically created and mapped, based on the characteristic of the commercial product. As a result, the decomposition relationships of a commercial product provide a product tree that may be used to manufacture the commercial product, or put another way, a tree that describes or defines the commercial product in terms of component technical products. Aspects of the present disclosure provide methods and systems for validating, creating, and/or mapping decompositions relationships between commercial products and technical products.

Input data file 141 may include input product data that may include commercial product data and technical product data. In aspects, as noted above, a relationship between commercial products and technical products may be based on a decomposition of the commercial product into the technical products. Put another way, commercial products may be decomposed into technical products. The input data file may be provided to optimization engine 143 (e.g., after being processed by data parser 142).

Data parser 142 may be configured to process the raw data in input data file 141 and convert it into objects that may understood by optimization engine 143. For example, in some aspects, input data file 141 may include a comma-separated values (csv) file that includes the raw data representing commercial products and technical products. In some aspects, the raw data includes product characteristics. Data parser 142 may group the data and convert into objects, such as a JSON objects, that includes a unique set of fields. In aspects, the JSON objects may represent product data objects. The output of data parser 142 may be sent to optimization engine 143.

Optimization engine 143 may be configured to analyze the input product data that may include commercial product data and technical product data, to validate the data and to create and map decomposition relationships between the commercial products and the technical products. In aspects, optimization engine 143 generates sets of attributes (e.g., a set of attributed or characteristics for the various commercial and technical products) from the input product data. In aspects, the sets of attributes may be validated against product data in the product management system. In particular, validity checker 145 may be configured to validate the format of the sets of attributes, and to determine a category for particular the products represented by the input data. In aspects, validity checker 145 may determine whether a product associated with a particular set of data (e.g., set of attributes) is a commercial product or a technical product. In aspects, validity data formatter 144 may be configured to validate the sets of attributes and data against product data in the product management system (e.g., including the determination that a particular product is a commercial product and/or technical product resulting from validity checker 145) and may generate and/or construct valid input data. For example, validity data formatter 144 may determine an intersection of commercial valid products and technical valid products, and may format the determined data according to system requirements to form decomposition relationships.

In aspects, optimization engine 143 may include software, hardware, and/or any combination thereof, and may be configured to execute instructions to implement functions, algorithms, and/or processes for optimizing the creation and mapping of decomposition relationships in accordance with the present disclosure. In mathematical terms, the algorithm implemented by optimization engine 143 may include a function for creating decomposition relationships and a function for mapping decomposition relationships. The algorithm may be modeled by equation 6 below.

$$\{F_{createDR}(\ ), F_{mapDR}(\ )\} \Rightarrow \{R_{DR}\} \tag{6}$$

In aspects, the function for creating decomposition relationship in accordance with aspects of the present disclosure may be implemented as in equation 7.

$$F_{createDR}(IP_{file}) \tag{7}$$

where $IP_{file}$ may be an input file and may be defined or generated as follows:

$$\sum_{i=0}^{n}\{DataFields_{input}, Cp_{input}, Tp_{input}\}, \text{such that:}$$

$n \in i=0$, where $n=|IP_{file}|$,

DataFields$_{input}$ denotes fields of data that may need to be created for the data given as input (e.g., fields that may be present in the input data but not present in the data stored in the product management system database), $Cp_{input}=\{c_1, c_2, c_3, \ldots, c_n\}$ defines a commercial product given as input, where $c_x$ denotes commercial product x.

$Tp_{input}=\{t_1, t_2, t_3, \ldots, t_n\}$ denotes the technical product given as input, where $t_x$ denotes characteristic x of the technical product. In some alternative aspects, $t_x$ may denote x of technical product. In this case, $Tp_{input}$ may denote a plurality of technical products.

In aspects, validation of the input file may be performed by the following process. Considering $Cp_{org}$ denotes existing commercial products (e.g., commercial products currently in the catalog (e.g., the EPC) or stored in a database of the product management system) and $Tp_{input}$ denotes existing technical products (e.g., commercial products currently in the catalog (e.g., the EPC) or stored in a database of the product management system), DataFields$_{org}$ denotes a set of existing fields that are present in structures currently stored in the database of the product management system, then:

$$Cp_{org}=\{c'_1, c'_2, c'_3, \ldots, c'_k\} \tag{8}$$

where $k \in \mathbb{N}$, k=|CommercialProducts$_{org}$|, and $c'_x$ denotes existing commercial product x of existing commercial products $Cp_{org}$, and $$Tp_{org}=\{t'_1, t'_2, t'_3, \ldots, t'_m\} \tag{9}$$

where $m \in \mathbb{N}$, and m=|TechnicalProducts$_{org}$|, and $t'_y$ denotes existing technical product y of existing technical products $Tp_{org}$.

Based on the definitions above, a many to many relationship between the commercial products and the technical products currently existing in the product management system may be constructed as the following relationship matrix:

$$Cp_{org} \times Tp_{org} = \begin{bmatrix} c'_1 t'_1 & \cdots & c'_1 t'_m \\ \vdots & \ddots & \vdots \\ c'_k t'_1 & \cdots & c'_k t'_m \end{bmatrix} \tag{10}$$

where $c'_x t'_y$ represents the relationship between existing commercial product x of existing commercial products $Cp_{org}$ and existing technical product y of existing technical products $Tp_{org}$.

These existing relationships (e.g., relationship matrix $Cp_{org} \times Tp_{org}$) may be stored in a database of the product management system, a database of server 102, and or may be stored in optimization tools 112.

In addition, a many to many relationship between the input commercial products and the input technical products (e.g., the products for which decompositions relationships are to me created, mapped and/or verified) may be constructed as the following relationship matrix:

$$Cp_{input} \times Tp_{input} = \begin{bmatrix} c_1 t_1 & \cdots & c_1 t_n \\ \vdots & \ddots & \vdots \\ c_n t_1 & \cdots & c_n t_n \end{bmatrix} \tag{11}$$

where x and $y \in \mathbb{N}$, $x \leq n$, $y \leq n$, and $c_x t_y$ represents a relationship between the input commercial product x of input commercial products $Cp_{input}$ and input technical product y of input technical product $Tp_{input}$. In aspects, $c_x t_y$ may be referred to as an input relationship between $c_x$ and $t_y$.

Given the constructed relationship matrix for the existing commercial and technical products, and the input commercial and technical products, the input data (e.g., $IP_{file}$) may be validated to obtain a set of valid input data $I_{valid}$. In aspects, $I_{valid}$ may be represented by the following equation:

$$I_{valid}=(Cp_{org} \times Tp_{org}) \cap (Cp_{input} \times Tp_{input}) \tag{12}$$

Figure 2:
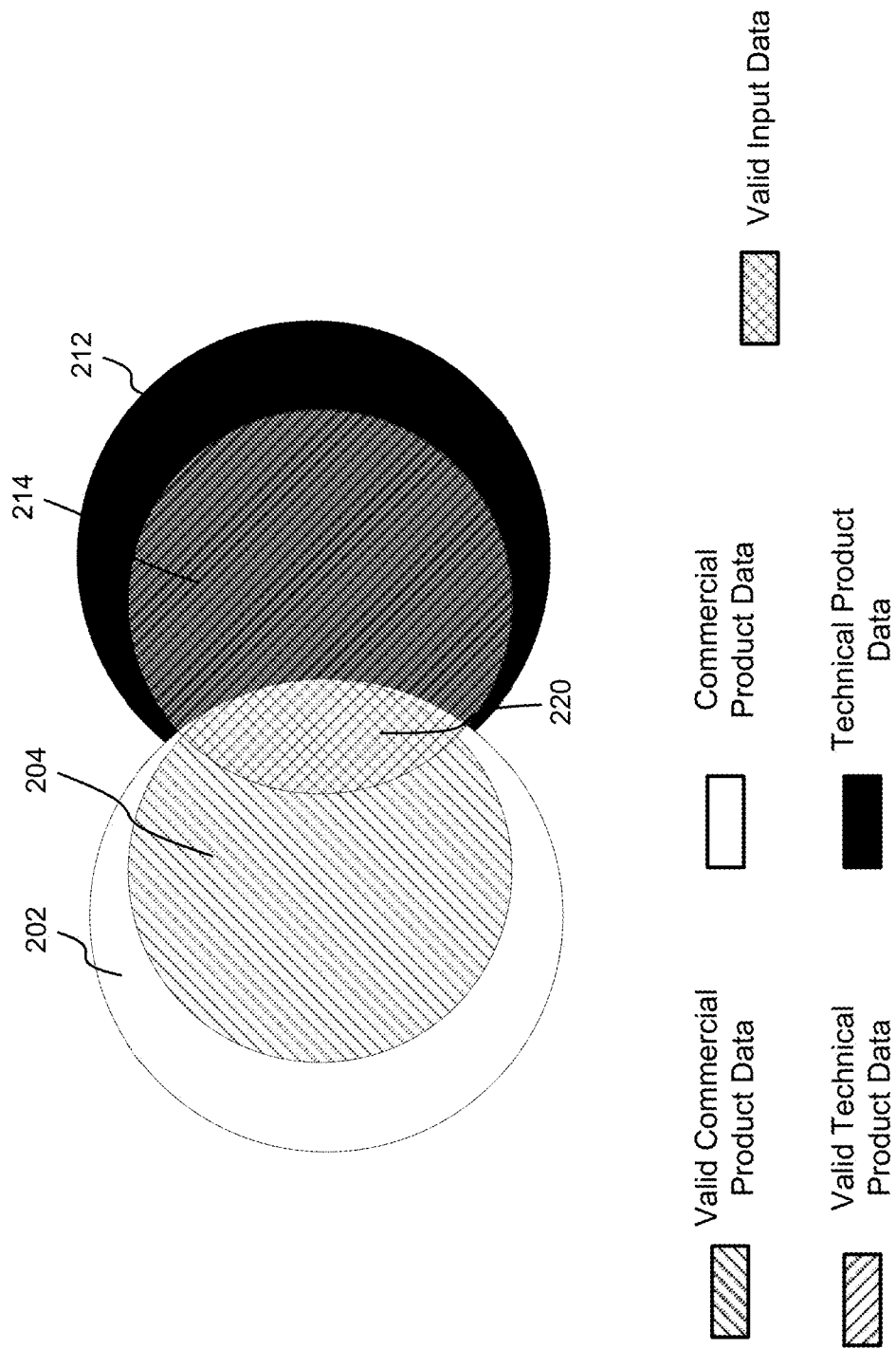
FIG. 2 is a diagram illustrating a graphical representation of a product input data validation process in accordance with aspects of the present disclosure.

FIG. 2 is a diagram illustrating a graphical representation of the product input data validation process in accordance with aspects of the present disclosure. In particular, the set of existing commercial product data 202, and the set of existing technical product data 212 may be obtained. A set of valid commercial product data 204 may be identified. The set of valid commercial product data 204 may be identified as input commercial product data that is already present in the set of existing commercial product data 202. A set of valid technical product data 214 may be identified. The set of valid technical product data 214 may be identified as input commercial product data that is already present in the set of existing technical product data 212.

The set of valid input data 220 may then be identified or obtained from the data included in the intersection between the set of data representing the many to many relationships between existing commercial products and technical products and the set of data representing the many to many relationships between input commercial products and technical products. Put another way, the set of valid input data 220 represents the set of input data for which the relationship between the input commercial products and technical products may already be derived or exists in system 100.

In embodiments, over iterations of the decomposition relationships process, frequently used/referred unique datasets with validity (valid or invalid) tags may be stored at cache level to optimize further data validity checks.

With the set of valid input data $I_{valid}$ identified, the set of valid input data $I_{valid}$ may be appended to the existing data set (e.g., data already existing in system 100). In particular, $I_{valid}$ may be appended to DataFields$_{org}$ in order to ensure that the data fields existing in the structures of the existing product data include the fields of the input product data.

Thus, in aspects, $DataFields_{input} = DataFields_{org} + I_{valid}$. In addition, $R_{DR}$ may be set to 'Success' to indicate that data validation was successful.

In aspects, the function for mapping decomposition relationships ($F_{mapDR}$) in accordance with aspects of the present disclosure may be implemented as in equation 13.

$$F_{mapDR}(IP_{file}) \quad (13)$$

where $IP_{file}$ may be an input file and may be defined or generated at least in part by $\Sigma^n_{i=0}\{DR_{input}\}$, such that $n \in \mathbb{N}$ denotes the size of $IP_{file}$, and where $DR_{input}$ is an input decomposition relationship to be mapped.

In aspects, given $t_x$ as a mapping of type x, there may be n different types of mapping available in system 100 such that $n \in \mathbb{N}$. In aspects, the number of different mapping types may be based on a predetermined configuration, or may be determined based on a previous creation of the mappings.

In aspects, a mapping may be created using function 14 as follows:

$$f_{createMap}(t_x, M_{types}) \quad (14)$$

where $t_x$ denotes the a mapping such that $x \in \mathbb{N}$, and $x \le n$, and where $M_{types}$ is a map of every mapping type available.

Given function 14, let M be a collection of all maps create for mapping the decomposition relationship. In this case, M may be defined by equation 15 as follows:

$$M = \Sigma_{j=0}^m \int_{k=1}^{t_x} f(i, M_k) \quad (15)$$

where $m \in \mathbb{N}$, and $m \le |DR_{maps}|$, where $DR_{maps}$ represents decomposition relationships already present in system 100.

With M obtained, $DR_s$ may be then be obtained, wherein $DR_s$ represents the decomposition relationships mapped to the existing decomposition relationships in system 100. $DR_s$ may be obtained using equation 16 as follows:

$$DRs = \Sigma_{i=0}^n f(i, M) \quad (16)$$

where $n \in \mathbb{N}$, and $n \le |Products_{org}|$, where $Products_{org}$ represents the existing product catalogs in the product management system.

In aspects, $R_{DR}$ may represent the resultant decomposition relationship mapped to the existing decomposition relationships in system 100, defined by $\Sigma DR_s$.

Output data file 146 may include the results of the decomposition creation and mapping by optimization engine 143. In aspects, output data file 146 may include the validated data, invalid data, and the decomposition relationships created and mapped. The data in output data file 146 may be formatted for presentation (e.g., displaying) to the user.

Figure 3:
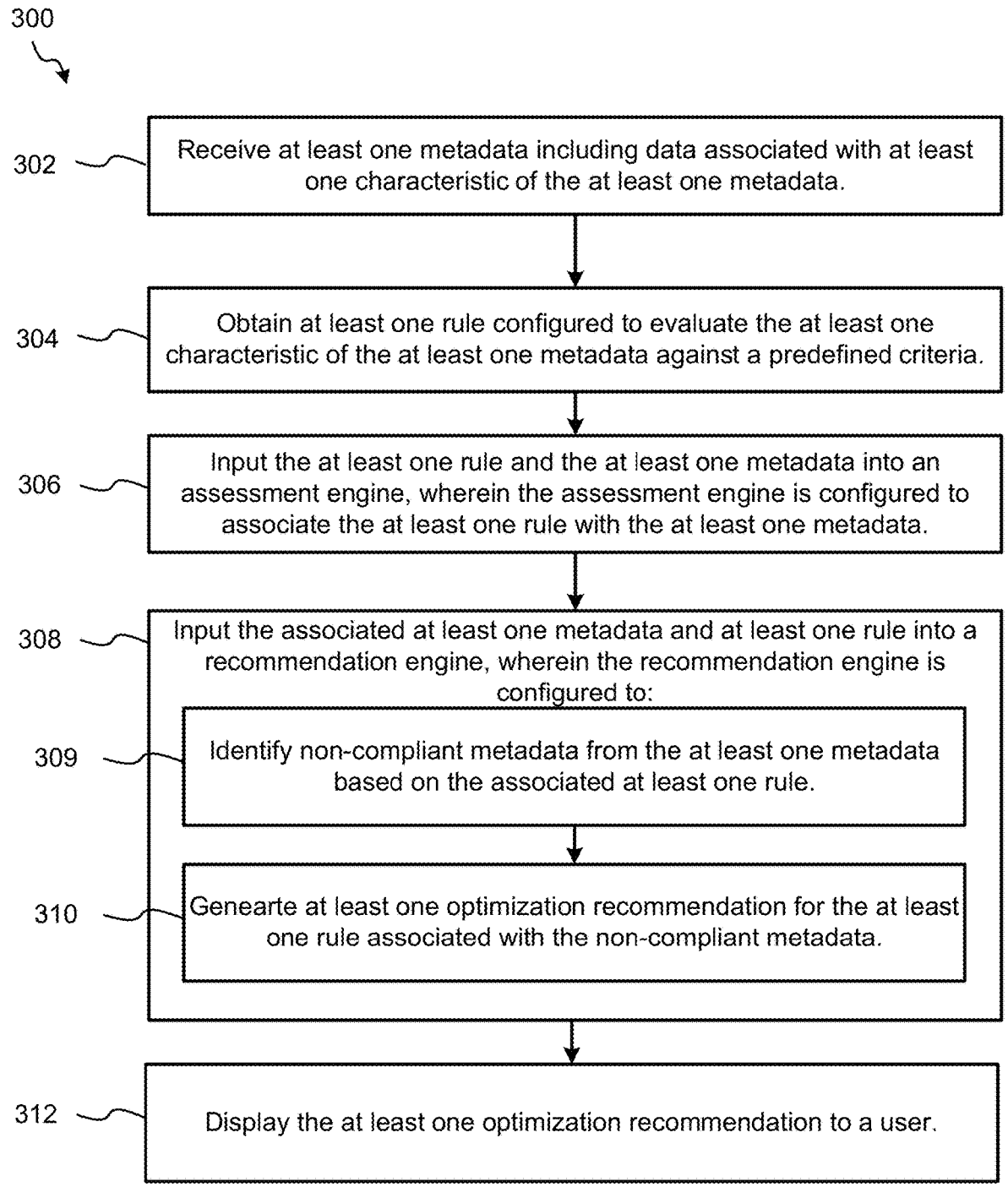
FIG. 3 a flow diagram illustrating an example of a method for optimizing component tools of a product management system in accordance with aspects of the present disclosure.

Referring to FIG. 3, a flow diagram illustrating an example of a method for optimizing component tools of a product management system according to one or more aspects is shown as a method 300. In some implementations, the operations of the method 300 may be stored as instructions that, when executed by one or more processors, cause the one or more processors to perform the operations of the method 300. In some implementations, the method 300 may be performed by a server, such as server 102 of FIG. 1.

The method 300 includes receiving at least one metadata including data associated with at least one characteristic of the at least one metadata, at 302. For example, metadata associated with at least one component tool of a product management system may be obtained (e.g., by a metadata engine such as metadata engine 123 of FIG. 1). In embodiments, the metadata may include data associated with a metadata type object.

The method 300 includes obtaining at least one rule configured to evaluate the at least one characteristic of the at least one metadata against a predefined criteria, at 304. For example, rules for evaluating characteristics of metadata may be obtained (e.g., by a rules engine such as rules engine 121 of FIG. 1). In embodiments, rules may be obtained from custom metadata, and in some embodiments may be user-specific. In embodiments, the rules may define a behavior, control, limitation, constraint, etc., with which an object associated with the metadata must comply.

The method 300 includes inputting the at least one rule and the at least one metadata into an assessment engine, at 306. In aspects, the assessment engine may be configured to associate the at least one rule with the at least one metadata. For example, in some embodiments, the assessment engine generates a relationship matrix that defines a many-to-many relationship between the at least one metadata and the at least one rule. In embodiments, each element indicates a relationship between one rule and one metadata. In some embodiments, each element of the relationship matrix represents an acceptance value of a corresponding rule, and the acceptance value of the corresponding rule may be based on an action by the user action related to a previous optimization recommendation for the corresponding rule.

The method 300 includes inputting the associated at least one metadata and at least one rule into a recommendation engine, at 308. In aspects, the recommendation engine is configured to identify non-compliant metadata from the at least one metadata based on the associated at least one rule, as shown at 309. Non-compliant metadata may include metadata from the at least one metadata whose at least one characteristic does not meet the predefined criteria in the associated at least one rule. The recommendation engine may also be configured to generate at least one optimization recommendation for the at least one rule associated with the non-compliant metadata, as illustrated at 310. For example, the recommendation engine may generate an optimization recommendation that includes at least one recommended action associated with the at least one rule (associated with the non-compliant metadata) to be selected by the user. In embodiments, the recommended actions may include one or more of: modifying at least one object associated with the non-compliant metadata, deleting the at least one rule, updating the at least one rule, replacing the at least one rule with a new rule, and ignoring the optimization recommendation.

The method 300 includes displaying the at least one optimization recommendation to a user, at 312. In aspects, displaying the optimization recommendations to the user may include displaying the recommended actions as selectable graphical elements. The user may select one of the recommended options (e.g., actions) or may simply ignore the recommendation and not select any action.

In some embodiments, a selection by the user of a recommended action associated with the at least one rule may be received. In these embodiments, the selected recommended action may be fed back to the assessment engine. Feeding back the selected recommended action to the assessment engine causes the assessment engine to update the acceptance value of the at least one rule based on the selected recommended action.

Figure 4:
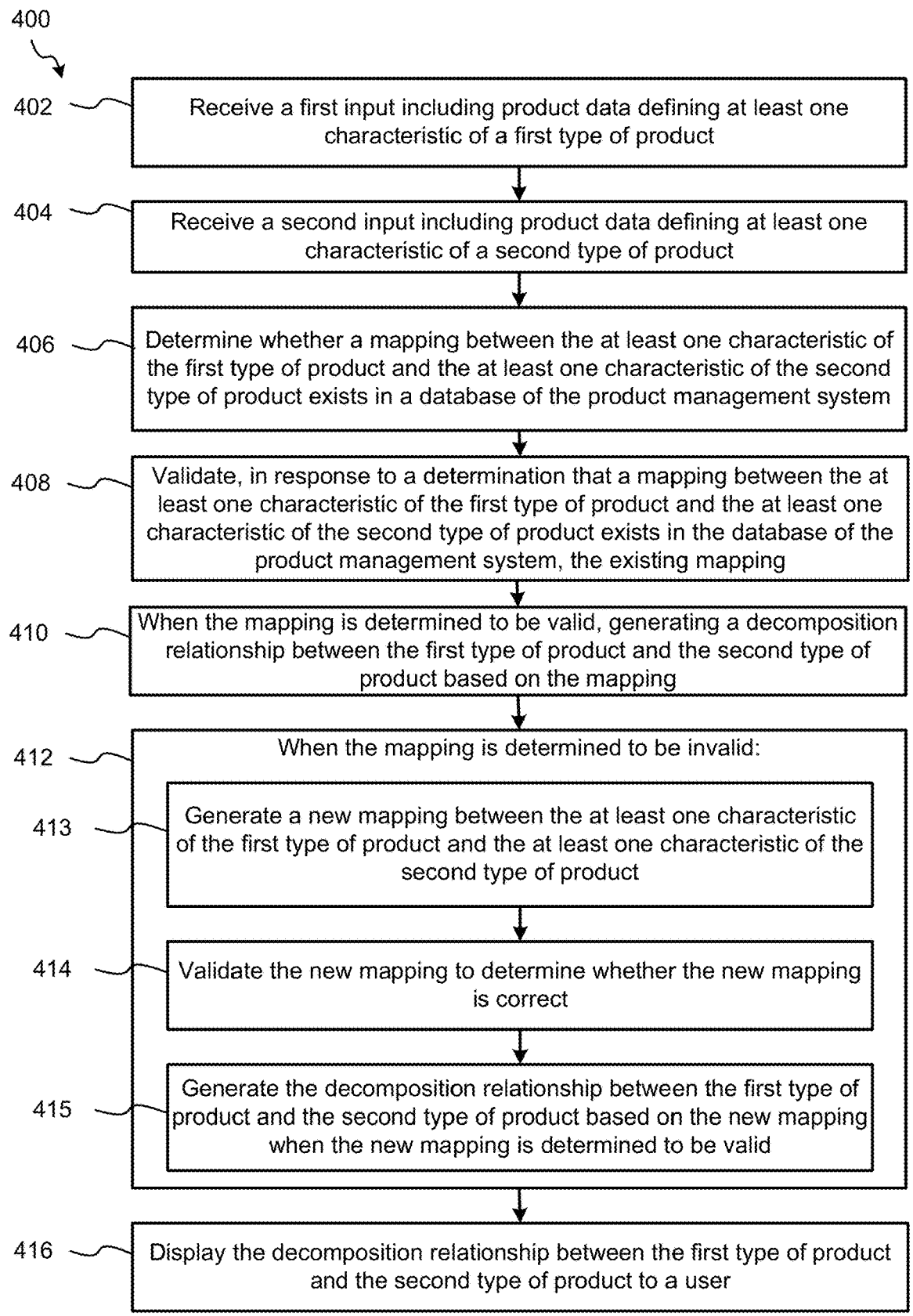
FIG. 4 a flow diagram illustrating an example of a method for building decomposition relationships in a product management system in accordance with aspects of the present disclosure.

Referring to FIG. 4, a flow diagram illustrating an example of a method for building decomposition relationships in a product management system according to one or more aspects is shown as a method 400. In some implementations, the operations of the method 400 may be stored as instructions that, when executed by one or more processors, cause the one or more processors to perform the operations of the method 400. In some implementations, the method 400 may be performed by a server, such as server 102 of FIG. 1.

The method 400 includes receiving a first input including product data defining at least one characteristic of a first type of product, at 402. At block 404, the method 400 includes receiving a second input including product data defining at least one characteristic of a second type of product. For example, an input data file (e.g., input data file 141 from FIG. 1) may be received. The input data file may include product data defining at least one characteristic of a commercial product and at least one characteristic of a technical product.

The method 400 includes determining whether a mapping between the at least one characteristic of the first type of product and the at least one characteristic of the second type of product exists in a database of the product management system, at 406. At 408, the method 400 includes validating, in response to a determination that a mapping between the at least one characteristic of the first type of product and the at least one characteristic of the second type of product exists in the database of the product management system, the existing mapping. In aspects, a validation process of the mapping may include determining an intersection between the set of valid commercial product data and the set of valid technical product data.

The method 400 includes, when the mapping is determined to be valid, generating a decomposition relationship between the first type of product and the second type of product based on the mapping, at 410. In embodiments, generating the decomposition relationship may include applying the algorithm discussed above with respect to optimization engine 143.

In accordance with the method 400, when the mapping is determined to be invalid at 412, the method 400 includes, at 413, generating a new mapping between the at least one characteristic of the first type of product and the at least one characteristic of the second type of product. At 414 of method 400, the new mapping is validated to determine whether the new mapping is correct. At 415 of method 400, a decomposition relationship between the first type of product and the second type of product is generated based on the new mapping when the new mapping is determined to be valid.

The method 400 includes displaying the decomposition relationship between the first type of product and the second type of product to a user, at 416. In aspects, displaying the decomposition relationship to a user may include displaying the may include displaying the validated data, invalid data, and the decomposition relationships created and mapped.

It is noted that other types of devices and functionality may be provided according to aspects of the present disclosure and discussion of specific devices and functionality herein have been provided for purposes of illustration, rather than by way of limitation. It is noted that the operations of the method 300 of FIG. 3 and the method 400 of FIG. 4 may be performed in any order, or that operations of one method may be performed during performance of another method. It is also noted that the method 300 of FIG. 3 and the method 400 of FIG. 4 may also include other functionality or operations consistent with the description of the operations of the system 100 of FIG. 1.

Those of skill in the art would further understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-4) include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

The invention claimed is:

1. A method for optimizing component tools of a product management system, the method comprising:
 receiving at least one metadata including data associated with at least one characteristic of the at least one metadata;
 obtaining at least one rule configured to evaluate the at least one characteristic of the at least one metadata against a predefined criteria;
 inputting the at least one rule and the at least one metadata into an assessment engine, wherein the assessment engine is configured to:
  generate a first relationship matrix defining a many-to-many relationship between the at least one metadata and the at least one rule, wherein each element indicates a relationship between one rule and one metadata, and wherein each element of the first relationship matrix includes an indication indicating an acceptance value of a corresponding rule;
 inputting the at least one metadata and at least one rule into a recommendation engine, wherein the recommendation engine is configured to:
  identify non-compliant metadata from the at least one metadata based on the at least one rule; and
  generate at least one optimization recommendation for the at least one rule associated with the non-compliant metadata;
 receiving an indication of an action selected for the at least one optimization recommendation;
 adjusting, within the first relationship matrix, an acceptance value of the at least one rule based on the indication as feedback in a self-learning process of the recommendation engine; and
 reducing, based on the at least one optimization recommendation, an execution frequency of the at least one rule within at least one computing device of the product management system.

2. The method of claim 1, wherein obtaining the at least one rule includes:
 obtaining at least one metadata object associated with a user, the metadata object including the at least one rule; and
 extracting the at least one rule from the at least one metadata object.

3. The method of claim 1, wherein a recommendation engine uses the acceptance value of the corresponding rule to determine, at least in part, an optimization recommendation for the corresponding rule.

4. The method of claim 1, wherein the non-compliant metadata includes metadata from the at least one metadata whose at least one characteristic does not meet the predefined criteria in the at least one rule.

5. The method of claim 1, wherein the optimization recommendation includes at least one recommended action associated with the at least one rule.

6. The method of claim 5, wherein the recommended action includes one or more of:
 modifying at least one object associated with the non-compliant metadata;
 deleting the at least one rule;
 updating the at least one rule;
 replacing the at least one rule with a new rule, wherein the recommendation engine is further configured to generate the new rule and provide the new rule in the at least one optimization recommendation; and
 ignoring the at least one optimization recommendation.

7. The method of claim 1, further comprising receiving a request from a user to perform an assessment of the at least one rule and the at least one metadata, and wherein the optimization recommendation is generated in response to receiving the request from the user.

8. The method of claim 1, further comprising displaying one or more of:
 the at least one rule; and
 the non-compliant metadata.

9. The method of claim 8, further comprising, when displaying the non-compliant metadata, displaying at least one selectable option for disposing of the non-compliant metadata, the at least one selectable option including one or more of: an option to delete the non-compliant metadata, an option to update the non-compliant metadata, and an option to ignore the non-compliant metadata.

10. The method of claim 1, further comprising:
 generating a second relationship matrix defining relationships between non-compliant metadata and corresponding recommendations, wherein the action selected for the at least one optimization recommendation is defined as a value of the second relationship matrix.

11. A system for optimizing metadata evaluation rules, the system comprising:
 a rules assessment manager configured to:
  receive at least one metadata including data associated with at least one characteristic of the at least one metadata;
  obtain at least one rule configured to evaluate at least one characteristic of metadata against a predefined criteria; and
  generate a first relationship matrix defining a many-to-many relationship between the at least one metadata and the at least one rule, wherein each element indicates a relationship between one rule and one metadata, and wherein each element of the first relationship matrix includes an indication indicating an acceptance value of a corresponding rule;
 a recommendation engine configured to:
  receive the at least one metadata and at least one rule;
  identify non-compliant metadata from the at least one metadata based on the at least one rule;
  generate at least one optimization recommendation for the at least one rule associated with the non-compliant metadata; and
  reduce, based on the at least one optimization recommendation, an execution frequency of the at least one rule within at least one computing device,
 wherein the rules assessment manager is further configured to:
  receiving an indication of an action selected for the at least one optimization recommendation; and
  adjusting, within the first relationship matrix, an acceptance value of the at least one rule based on the indication as feedback in a self-learning process of the recommendation engine.

12. The system of claim 11, wherein a recommendation engine is configured to use the acceptance value of the corresponding rule to determine, at least in part, an optimization recommendation for the corresponding rule.

13. The system of claim 11, wherein the optimization recommendation includes at least one recommended action associated with the at least one rule.

14. The system of claim 13, wherein the recommended action includes one or more of:
- deleting the at least one rule;
- updating the at least one rule;
- replacing the at least one rule with a new rule, wherein the recommendation engine is further configured to generate the new rule and provide the new rule in the at least one optimization recommendation; and
- ignoring the at least one optimization recommendation.

* * * * *

UNITED STATES PATENT AND TRADEMARK OFFICE
CERTIFICATE OF CORRECTION

PATENT NO. : 12,051,025 B2
APPLICATION NO. : 17/161635
DATED : July 30, 2024
INVENTOR(S) : Vaibhav Shah et al.

It is certified that error appears in the above-identified patent and that said Letters Patent is hereby corrected as shown below:

In the Specification

At Column 14, Line number 56, equation 2, delete the portion of the equation reading "$m'^2$" and replace with --$m'_2$--.

Signed and Sealed this
First Day of October, 2024

Katherine Kelly Vidal
*Director of the United States Patent and Trademark Office*